United States Patent
Lordahl et al.

(10) Patent No.: US 7,182,096 B1
(45) Date of Patent: Feb. 27, 2007

(54) SELF CLEANING METERING DEVICE FOR DIAPHRAGM STYLE FLUSH VALVE

(75) Inventors: Var E. Lordahl, 1571 Schaeffer Rd., Long Grove, IL (US) 60047; Scott H. Koepeel, Winthrop Harbor, IL (US)

(73) Assignee: Var E. Lordahl, Long Grove, IL (US)

( * ) Notice: Subject to any disclaimer, the term of this patent is extended or adjusted under 35 U.S.C. 154(b) by 219 days.

(21) Appl. No.: 11/043,368

(22) Filed: Jan. 26, 2005

(51) Int. Cl.
*B08B 9/00* (2006.01)
*F16K 51/00* (2006.01)

(52) U.S. Cl. .................................... 137/244; 137/245.5
(58) Field of Classification Search ................ 137/244, 137/242, 245.5; 251/331
See application file for complete search history.

(56) References Cited

U.S. PATENT DOCUMENTS

| | | | | |
|---|---|---|---|---|
| 1,937,555 A | * | 12/1933 | Estler | 138/44 |
| 4,787,411 A | * | 11/1988 | Moldenhauer | 137/244 |
| 5,167,251 A | * | 12/1992 | Kirstein | 137/244 |
| 5,213,124 A | * | 5/1993 | Costa | 137/244 |
| 5,964,408 A | * | 10/1999 | Musson | 239/123 |

* cited by examiner

*Primary Examiner*—Kevin Lee
(74) *Attorney, Agent, or Firm*—Kajane McManus

(57) ABSTRACT

The self cleaning metering device for a diaphragm of a diaphragm type flush valve comprises a metering cap having a metering orifice therein, a hollow retainer threadedly engaged to the metering cap, the diaphragm being sandwiched therebetween, and a cleaning element comprising a spring coil movably seated within the device, the coil having a first pin centered relative to the metering orifice and extending therethrough and a second pin extending opposite the first pin into and through the hollow retainer, wherein water flowing through the metering device acts to move the coil, and pins thereof, the coil and pins acting to clean debris from the interior of the device upon moving therewithin.

9 Claims, 3 Drawing Sheets

SELF CLEANING METERING DEVICE FOR DIAPHRAGM STYLE FLUSH VALVE

BACKGROUND OF THE INVENTION

1. Field of the Invention

The present invention relates to a self cleaning metering device for diaphragm style flush valves. More particularly, the metering device comprises a metering cap into which a retainer is threadedly received, with a space between the cap and retainer accommodating a self actuating cleaning element therein for maintaining the device free of debris, the cleaning element being actuated by flow of water through the device.

2. Prior Art

Heretofore diaphragms incorporating a metering device for use in diaphragm style flush valves have been well know.

Also it has been proposed to provide a cleaning wire extending through the metering device, the wire requiring free ends thereof to be curled to maintain the wire within the device.

Such configuration is very labor intensive to create, making such device expensive to produce and does not use the flow of water efficiently to activate itself.

As will be described in greater detail below, the device of the present invention is not labor intensive, making the device less expensive. Further, a greater inner area of the device is cleaned with the present configuration and uses a far greater area of the cleaning element to activate itself far more efficiently and effectively.

SUMMARY OF THE INVENTION

According to the invention there is provided the self cleaning metering device for a diaphragm of a diaphragm type flush valve comprises a metering cap having a metering orifice therein, a hollow retainer threadedly engaged to the metering cap, the diaphragm being sandwiched therebetween, and a cleaning element comprising a spring coil movably seated within the device, the coil having a first pin centered relative to the metering orifice and extending therethrough and a second pin extending opposite the first pin into and through the hollow retainer, wherein water flowing through the metering device acts to move the coil, and pins thereof, the coil and pins acting to clean debris from the interior of the device upon moving therewithin.

DESCRIPTION OF THE PREFERRED EMBODIMENT

Figure 1:
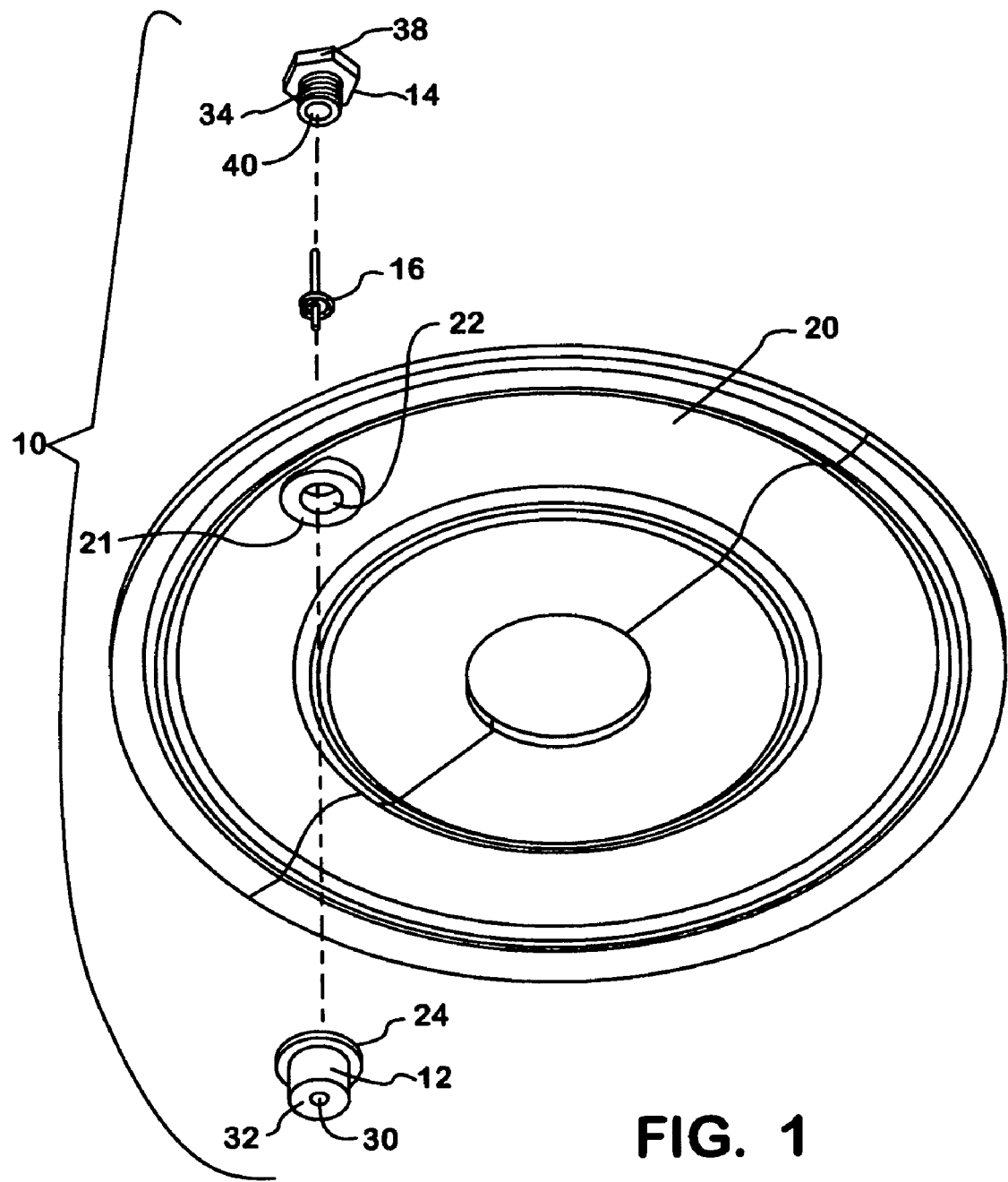
FIG. 1 is an exploded perspective view of a flush valve diaphragm incorporating the self cleaning metering device of the present invention.
Figure 2:
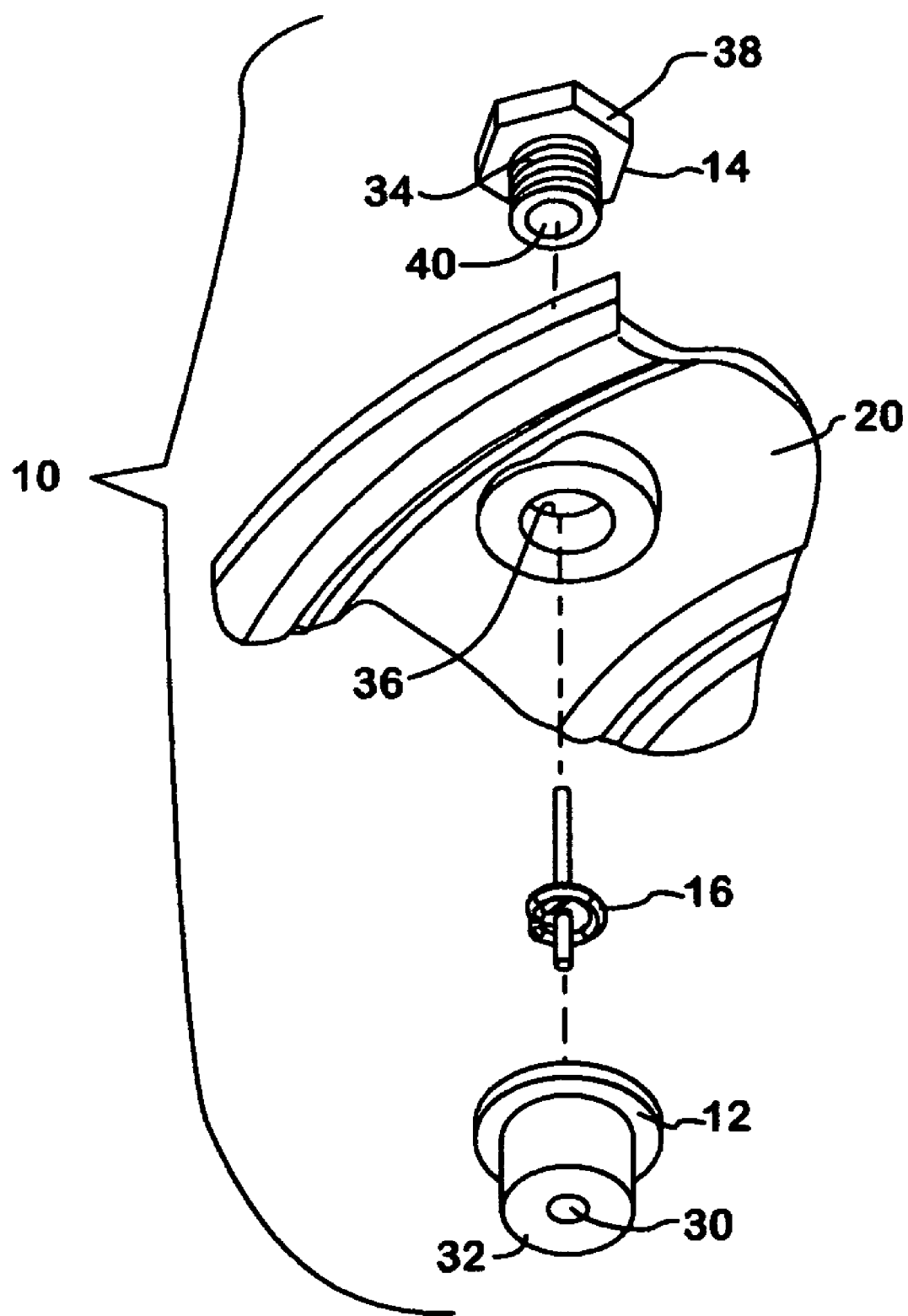
FIG. 2 is an enlarged exploded perspective view of a section of a flush valve diaphragm incorporating the self cleaning metering device of the present invention.
Figure 3:
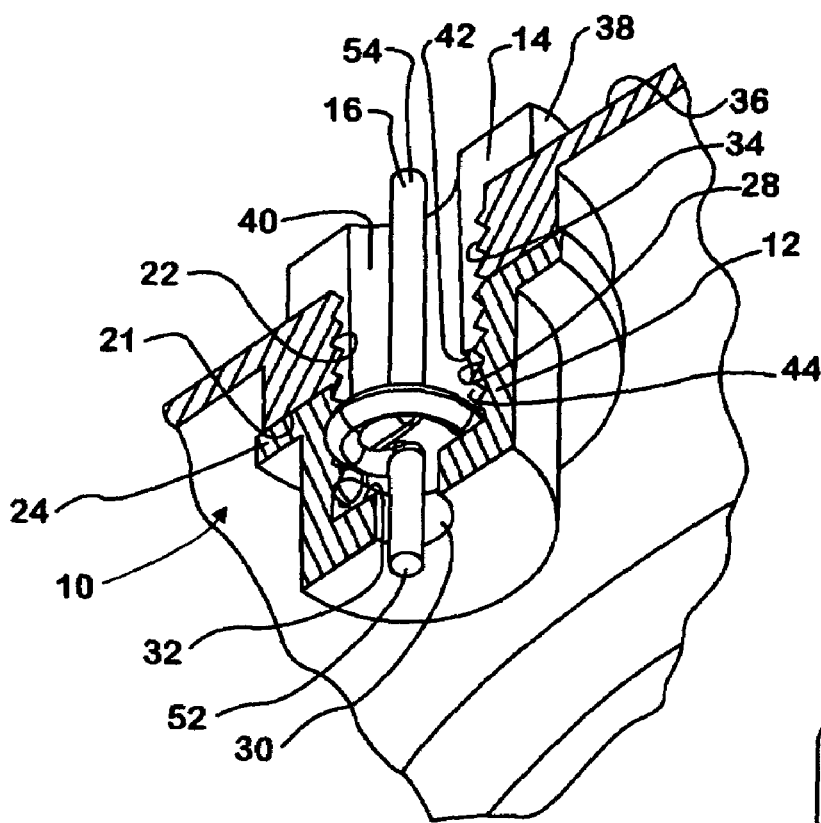
FIG. 3 is a sectional view through the diaphragm showing the self cleaning metering device incorporated therein.
Figure 4:
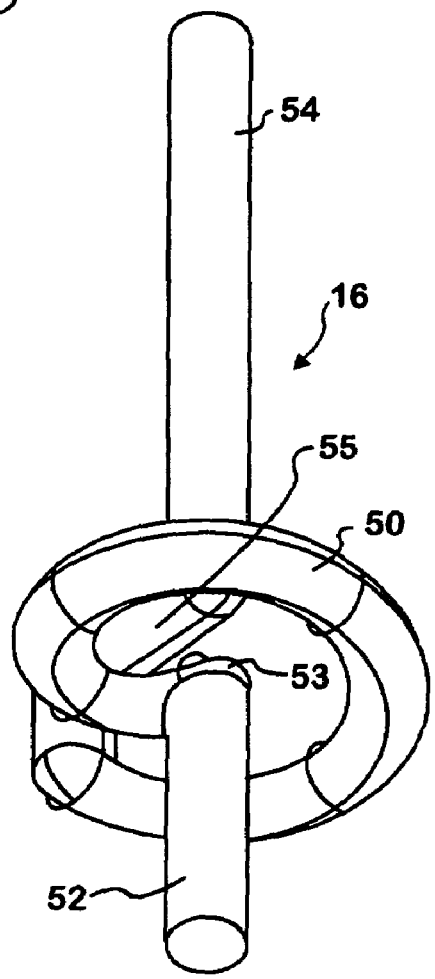
FIG. 4 is an enlarged perspective view of the cleaning element of the device.

Referring now to the drawings in greater detail there is illustrated therein a self cleaning metering device for a diaphragm of a diaphragm style flush valve, the device being made in accordance with the teachings of the present invention and generally identified by the reference numeral 10.

As shown, the device 10 includes a metering cap 12, a retainer 14, and a cleaning element 16.

The device 10 is engaged to a diaphragm 20 by seating the metering cap 12 over a defining surface 21 of a port 22 in the diaphragm 20, with a flanged or top end 24 of the cap 12 abutting the defining surface 21 of the diaphragm 20.

The cap 12 is hollow, and has a threaded inner surface 28. A metering orifice 30 is provided in another or bottom end 32 of the cap 12, opposite the flanged end 24.

To engage the cap 12 to the diaphragm 20, a retainer 14 having a threaded outer surface 34 is passed through the port 22 from a top side 36 of the diaphragm 20 and the threaded outer surface 34 thereof is threaded to the threaded inner surface 28 of the cap 12 until a flanged or top end 38 of the retainer 14 abuts the top side 36 of the diaphragm 20 sandwiching the diaphragm 20 between the cap 12 and retainer 14.

The retainer 14 is a hollow cylinder having an outlet 40 therethrough which is of the greatest circumference possible without comprising integrity of the retainer 14. Such large diameter outlet 40 is desired so metering only takes place at the metering orifice 30 in the cap 12.

The length of the retainer 14 is such that it does not contact the end 32 of the cap 12, but rather forms a radially inwardly extending shoulder 42 a short distance below the end 32, forming a larger in diameter cavity 44 between the shoulder 42 of the retainer 14 and the end 32 of the cap 12.

The existence of this cavity 44 makes the provision of self cleaning capability to the device 10 simple to accomplish in an economical and more efficient manner than previously available.

Turning now to the cleaning element 16 of the device 10 it will be seen, in a simplistic form, to comprise a spring coil 50 having a first pin 52 extending from one end 53 of the coil 50 and a second pin 54 extending from a second free end 55 of the coil 50. The pins 52 and 54 are centered axially relative to a diameter of the coil 50 and extend oppositely of each other.

The thickness of the coil 50 is less than the height of the cavity 44 but is sufficient to be moved away from the end 32 of the cap 12, against gravity, by water entering through the metering orifice 30, passing through the cavity 44, and exiting through outlet 40 of the hollow retainer 14. Further, movement of the cleaning element 16 is constrained by the end 32 and shoulder 42 to limit travel of the element 16 such that it does not, at any position, contact a body of the valve (not shown).

In a preferred embodiment, the thickness of the coil is approximately 0.025 inch, though this should not be construed as limiting.

Inasmuch as the orifice 30 is a metering orifice, it is desirable that a particular flow of fluid be allowed to pass therethrough, as is known. It will be seen that one pin 52 of the coil 50 extends into and through the orifice 30 while the other pin 54 of the coil 50 extends into and through the outlet 40 of the retainer 14.

To produce the required flow through the metering orifice 30, the orifice 30 must be sized to avoid compromise of fluid flow therethrough by the presence of the pin 52 therein.

To accomplish such noncompromise, the required dimensions for the metering orifice 30 can be calculated as: $A = \pi(M/2 + S/2)(M/2 - S/2)$ where $A$ = area of the metering orifice;

$M$ = diameter of the metering orifice;

S=diameter of the spring
$\pi=3.1416$

It will be understood that the diameter of the spring coil 50 must be sufficient in size so as to be maintained within the device 10 by the inwardly extending shoulder 42 of the retainer 14.

In use, as water flows into the metering device 10, through the metering orifice 30, water pressure against the coil 50 forces same upwardly, toward the shoulder 42. Once flow of water ceases, the coil 50, through the force of gravity, returns to its resting position, against the end 32 of the metering cap 12. This reciprocating motion of the coil 50, together with the motion of pins 52 and 54 thereof has been found through empirical testing to maintain the device 10 free of substantially any debris buildup therein, such debris being inherently present in the water passing therethrough.

As described above the device 10 of the present invention, in combination with the method of creating the device 10, provides a number of advantages, some of which have been described above and others of which are inherent in the invention. Also, modifications to the device 10 and method of creating same can be proposed without departing from the teachings herein. Accordingly, the scope of the invention is only to be limited as necessitated by the accompanying claims.

The invention claimed is:

1. A self cleaning metering device for a diaphragm of a diaphragm type flush valve comprising a metering cap having a metering orifice therein, a hollow retainer threadedly engaged to the metering cap, with the diaphragm being sandwiched therebetween, and a cleaning element, comprising a spring coil having a pin extending from each free end thereof, movably seated within the device, water flowing through the metering device acting to move the cleaning device against gravity to clean debris from the interior of the device upon moving therewithin.

2. The device of claim 1 wherein the hollow retainer forms an outlet of the device.

3. The device of claim 1 wherein the metering orifice forms an inlet of the device.

4. The device of claim 1 wherein the outlet of the retainer is of a diameter greater than that of the metering orifice.

5. The device of claim 3 wherein the diameter of the retainer outlet is as great as possible without compromising the structure of the retainer.

6. The device of claim 5 wherein the free ends are aligned along an axial centerline of the coil.

7. The device of claim 1 wherein the pins extend oppositely of each other along the centerline.

8. The device of claim 5 wherein a diameter of the spring coil is greater than a diameter of an outlet of the retainer.

9. The device of claim 1 wherein a size and configuration for the metering orifice is calculated by $A=\pi(M/2+S/2)(M/2-S/2)$ where A=area of the metering orifice;
M=diameter of the metering orifice;
S=diameter of the spring
$\pi=3.1416$.

* * * * *